US009355316B2

(12) United States Patent
Stevens et al.

(10) Patent No.: US 9,355,316 B2
(45) Date of Patent: May 31, 2016

(54) IDENTIFYING AN OBSTACLE IN A ROUTE

(71) Applicant: International Business Machines Corporation, Armonk, NY (US)

(72) Inventors: Mark B. Stevens, Austin, TX (US); John D. Wilson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/477,610

(22) Filed: Sep. 4, 2014

(65) Prior Publication Data
US 2015/0339951 A1 Nov. 26, 2015

Related U.S. Application Data

(63) Continuation of application No. 14/284,564, filed on May 22, 2014.

(51) Int. Cl.
*G01C 21/00* (2006.01)
*G06K 9/00* (2006.01)
*G09B 21/00* (2006.01)
*G06K 9/46* (2006.01)
*G06K 9/62* (2006.01)
*H04N 7/18* (2006.01)

(52) U.S. Cl.
CPC ............ *G06K 9/00664* (2013.01); *G01C 21/00* (2013.01); *G06K 9/00* (2013.01); *G06K 9/46* (2013.01); *G06K 9/6202* (2013.01); *G09B 21/00* (2013.01); *G09B 21/001* (2013.01); *G09B 21/008* (2013.01); *H04N 7/181* (2013.01)

(58) Field of Classification Search
CPC .......... B60W 2420/42; G06K 9/00798; G06K 9/00805; G08G 1/165

USPC ............ 701/2, 15, 26, 28, 36, 29.1, 400, 117, 701/411, 428; 348/119; 455/456.1
See application file for complete search history.

(56) References Cited

U.S. PATENT DOCUMENTS 7,408,465 B2   8/2008 Boss et al.
7,598,976 B2   10/2009 Sofer et al.
(Continued)

FOREIGN PATENT DOCUMENTS

CN     102499862 A    6/2012
WO     2013186574 A2   12/2013

OTHER PUBLICATIONS

Anonymous, "Method for Implementation of a Location, Direction, Speed Based Smarter Notification Service", IP.com Prior Art Database Technical Disclosure. IP.com No. IPCOM000233241D, Published Dec. 3, 2013. 4 pages.

(Continued)

*Primary Examiner* — Gertrude Arthur Jeanglaud
(74) *Attorney, Agent, or Firm* — Jay Wahlquist; Mark Vallone

(57) ABSTRACT

A system and computer implemented method for identifying an object in a route is disclosed. The method may include capturing a first set of images during a first traversal of a first route. The method may also include capturing a second set of images during a second traversal of the first route. The method may also include identifying, by comparing the first set of images with the second set of images, an object in the second set of images meeting an obstruction criteria. The method may also include providing a notification of the object which was identified as meeting the obstruction criteria.

13 Claims, 4 Drawing Sheets

(56) References Cited

U.S. PATENT DOCUMENTS

| | | | |
|---|---|---|---|
| 8,605,141 B2 | 12/2013 | Dialameh et al. | |
| 8,751,154 B2* | 6/2014 | Zhang | B60W 30/09 348/119 |
| 2005/0171654 A1* | 8/2005 | Nichols | G08G 5/0078 701/15 |
| 2006/0129308 A1 | 6/2006 | Kates | |
| 2008/0143517 A1 | 6/2008 | Goffin | |
| 2009/0005071 A1* | 1/2009 | Forstall | G06F 3/0481 455/456.1 |
| 2010/0263603 A1 | 10/2010 | Baron | |
| 2012/0127291 A1 | 5/2012 | Mahoney | |
| 2013/0216093 A1 | 8/2013 | Lee et al. | |
| 2013/0250078 A1 | 9/2013 | Levy | |
| 2013/0253818 A1 | 9/2013 | Sanders et al. | |
| 2013/0332452 A1 | 12/2013 | Jarvis | |
| 2014/0040252 A1 | 2/2014 | Jarvis | |
| 2014/0112537 A1 | 4/2014 | Frank et al. | |
| 2015/0116082 A1 | 4/2015 | Cregg et al. | |

OTHER PUBLICATIONS

Barraud, E., "Mapping a Room in a Snap", Mediacom, Jun. 18, 2013. http://actu.epfl.ch/news/mapping-a-room-in-a-snap/.

Blum, J., et al., "What's around Me? Spatialized Audio Augmented Reality for Blind Users with a Smartphone", Mobile and Ubiquitous Systems: Computing, Networking, and Services. Lecture Notes of the Institute for Computer Sciences, Social Informatics and Telecommunications Engineering vol. 104, 2012, pp. 49-62. © Springer, Part of Springer Science+Business Media.

Coughlan, J., et al., "Cell Phone-based Wayfinding for the Visually Impaired", 15 pages.

Hollister, S., "OrCam's $2,500 augmented reality glasses speak words aloud, help the visually impaired 'see'", Jun. 5, 2013, 11:38 p.m. http://www.theverge.com/2013/6/5/4400990/orcam-glasses-read-aloud.

IBM, "Environmental and Hazard Detection Using a Portable Apparatus", IP.com Prior Art Database Technical Disclosure. IP.com No. IPCOM000177547D, published Dec. 17, 2008. 3 pages.

Ivanchenko, V., et al., "Crosswatch: a Camera Phone System for Orienting Visually Impaired Pedestrians at Traffic Intersections", 7 pages.

Kim, et al., Usability and Design Guidelines of Smart Canes for Users with Visual Impairments, International Journal of Design, 2013. vol. 7, No. 1. pp. 99-110.

Stevens, M., et al., "Identifying an Obstacle in a Route", U.S. Appl. No. 14/284,564, filed May 22, 2014. IBM.

Stevens, M., et al. "Identifying a Change in a Home Environment", U.S. Appl. No. 14/284,581, filed May 22, 2014. IBM.

Swobodzinski, M., et al., "An indoor routing algorithm for the blind: development and comparison to a routing algorithm for the sighted", International Journal of Geographical Information Science. vol. 00, No. 00, Jun. 2008, pp. 1-28.

Tapu, R., et al., "A Computer Vision System that Ensure the Autonomous Navigation of Blind People", The 4th IEEE International Conference on E-Health and Bioengineering—EHB 2013. Grigore T. Popa University of Medicine and Phamacy. Iasi, Romania, Nov. 21-23, 2013. Copyright 2013 IEEE.

Unknown, "What is LookTel" LookTel.com 3 pages. http://www.looktel.com.

Yi, C., et al., "Finding Objects for Assisting Blind People", Network Modeling Analysis in Health Informatics and Bioinformatics. 13 pages.

List of Patents or Patent Applications Treated as Related.

* cited by examiner

IDENTIFYING AN OBSTACLE IN A ROUTE

FIELD

The present disclosure relates to various embodiments of a system and method for object identification, and more specifically, to detecting an obstacle in a route of a visually impaired user.

BACKGROUND

In the field of computer vision, object recognition is the task of finding and identifying objects in an image or video sequence. Object recognition techniques can be leveraged to objects that may be potential obstacles. Accordingly, using object recognition techniques to identify obstacles may provide benefits associated with navigation of a route.

SUMMARY

Aspects of the present disclosure, in certain embodiments, are directed toward a method for identifying an object in a route. In certain embodiments, the method may include capturing a first set of images during a first traversal of a first route. In certain embodiments, the method may include capturing a second set of images during a second traversal of the first route. In certain embodiments, the method may include identifying, by comparing the first set of images with the second set of images, an object in the second set of images meeting an obstruction criteria. In certain embodiments, the method may include providing a notification of the object which was identified as meeting the obstruction criteria.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
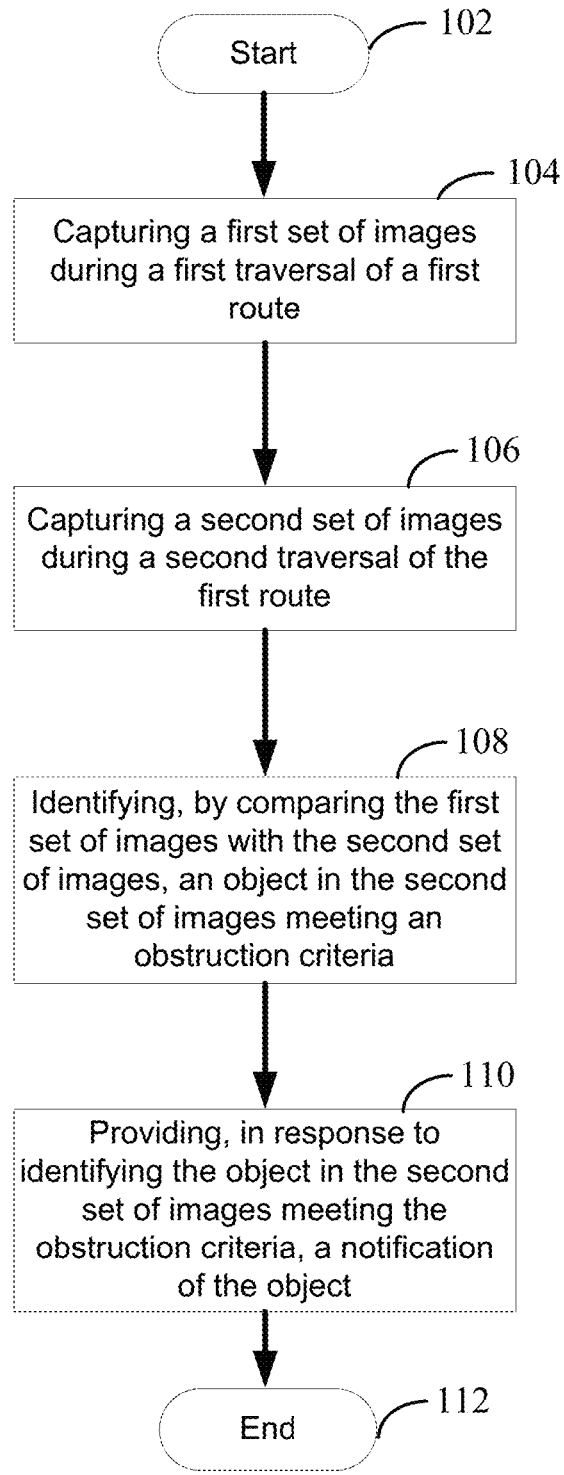
FIG. 1 is a flowchart illustrating a method for identifying an obstacle in a route, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to various embodiments of a system and method for object identification. More particular aspects of the present disclosure relate to detecting an obstacle in a route of a visually impaired user. The method includes capturing a first set of images during a first traversal of a first route, and capturing a second set of images during a second traversal of the first route. An object in the second set of images meeting an obstruction criteria is identified. Identifying the object meeting the obstruction criteria includes comparing the first set of images with the second set of images and detecting the object using an image processing algorithm. The method may also include providing, in response to identifying the object in the second set of images meeting the obstruction criteria, a notification of the object.

For a visually impaired person, navigating a route from one location to another can pose a variety of challenges. If a visually impaired person is not familiar with the route, there may be a number of obstacles that he or she carefully maneuvers to arrive at his or her intended destination. When a visually impaired person is traversing a known route (e.g., a path they take relatively frequently), he or she may have memorized the location of objects and the number of steps from one location to another. However, aspects of the present disclosure relate to the recognition that, in certain situations, an unexpected obstacle in a known route (e.g., an object that has been moved into the route) may be potentially hazardous to a visually impaired person, as he or she may not be on their guard for obstacles when traveling a familiar route. Accordingly, aspects of the present disclosure, in certain embodiments, relate to a system and method for capturing images of a route, and identifying potential obstacles. A notification of the potential obstacle may be provided to the user of the system. Aspects of the present disclosure may provide benefits associated with confidence, efficiency (e.g., faster and safer route traversal) and safety for a visually impaired user.

Aspects of the present disclosure include a method and system for object identification. More particular aspects relate to detecting an obstacle in a route. The method and system may work on a number of devices and operating systems. Aspects of the present disclosure include capturing a first set of images during a first traversal of a first route. Aspects of the present disclosure also include capturing a second set of images during a second traversal of the first route. In certain embodiments, the first set of images and the second set of images are captured by a mobile device, such as a smart phone, a tablet, a smart watch, wearable computing device, or other such system. In certain embodiments, the first set of images and the second set of images are captured at specified time intervals (e.g., 30 seconds, 1 minute, 3 minutes, etc.) Certain embodiments of the present disclosure are directed toward capturing a first set of videos and a second set of videos for identifying an object in a route. Capturing the first set of images during the first traversal of the first route may include creating a starting point of the first route. The starting point of the first route may be created in response to a route traversal initiation command. In response to receiving the route traversal initiation command, the method can include collecting image data and distance data for a path traversed by a user. The method can also include creating an ending point of the first route in response to receiving a route traversal termination command. In certain embodiments, the first set of images and the second set of images are captured at a set of image capture locations, such as doorways, corners, hallways entrances, or configurable distance increments.

In certain embodiments, capturing the first set of images during the first traversal of the first route includes collecting route frequency data for a set of routes traversed by a user. The first route may, for example, be a frequently traversed path by a user between a first location and a second location. The method can then include determining, for a specific route of the set of routes traversed by a user, that a frequency value is greater than a frequency threshold value. In response to determining that the specific route has a frequency value greater than a frequency threshold value, the method includes selecting the route as the first route.

Aspects of the present disclosure, in certain embodiments, are directed toward identifying an object in the second set of images meeting an obstruction criteria. The object in the second set of images meeting the obstruction criteria can be identified by comparing the first set of images with the second set of images. The obstruction criteria can include a displacement threshold and an object size threshold. In certain embodiments, identifying the object in the second set of images meeting the obstruction criteria includes using a digital image processing algorithm configured to use Scale-Invariant-Feature Transform (SIFT) techniques to detect one or more objects and measure one or more dimensions of the one or more objects.

Aspects of the present disclosure, in certain embodiments, are directed toward providing a notification of the object. The notification of the object can be provided in response to identifying the object in the second set of images meeting the instruction criteria. The notification of the object may be provided as a voice call/message to a mobile device. The method may also include determining, using a user interface provided on the mobile device, a set of route preferences and a set of obstruction criteria preferences.

Turning now to the figures, FIG. 1 is a flowchart illustrating a method 100 for identifying an obstacle in a route, consistent with embodiments of the present disclosure. Aspects of FIG. 1 are directed toward using images captured at a set of image capture points to identify an obstacle in the path of a user. The method 100 may begin at block 102 and end at block 112. Consistent with various embodiments, the method 100 can include a first capturing block 104, a second capturing block 106, an identifying block 108, and a providing block 110.

Consistent with various embodiments of the present disclosure, at block 104 the method 100 includes capturing a first set of images during a first traversal of a first route. The first route may be a path taken by a user from one location to another. For instance, a user at his or her workplace walking from his or her office to the nearest bathroom may be an example of the first route. The first traversal includes the movement of a user from a first location to a second location along the first route. In certain embodiments, the first set of images is captured by a mobile device. For example, the first set of images may be captured by a smart phone, tablet, smart watch, wearable computing device, or other such system. In certain embodiments, the first set of images is captured at specific time intervals (e.g., 30 seconds, 1 minute, 3 minutes, etc.). The images can be stored locally on the mobile device, or can be stored on a remote storage device or server accessible to the mobile device. The images may portray the features of the environment surrounding the user. For example, the images may show a hallway including one or more doorways, wastebaskets, people, and other features of the environment. In certain embodiments, the method 100 includes capturing a first set of videos of the environment. In certain embodiments, the first set of images is a set of images depicting the first route with no identified obstructions. In certain embodiments, the first set of images is a collection of images (e.g., images with no obstructions) from the first traversal of the first route as well as subsequent traversals of the first route. Other configurations for the first set of images are also contemplated.

Consistent with various embodiments, the first route may be determined in one of a number of ways. In certain embodiments, the first route is a frequently traversed path by a user between a first location and a second location. That is, the first route is determined based on the number of times that a user takes a particular route. Accordingly, in certain embodiments, capturing the first set of images includes collecting route frequency data for a set of routes traveled by a user. The route frequency data may be a record of the number of times a user has taken a certain path within a certain time period. Further, capturing the first set of images includes determining, for a specific route of the set of routes traversed by a user, that a frequency value is greater than a frequency threshold value. In response to determining that the specific route has a frequency value higher than a frequency threshold value, the specific route is selected as the first route.

Consider the following example. While at a workplace, a user may travel from his or her office to one or more other destinations (bathroom, lunchroom, vending machine, coworkers' offices, etc.) multiple times through the course of a day. The method 100 includes monitoring the routes taken by the user, and the number of times a user takes each route during the day. A user may travel to the lunchroom once a day, the vending machine twice a day, a coworker's office twice a day, and the bathroom 6 times a day. The frequency threshold value may be 5 times per day. Accordingly, as the user has visited the bathroom 6 times during the day, the path from the office of the user to the bathroom may be determined to be the first route. Other frequency threshold values are also possible. For example, in certain embodiments, the frequency threshold value may be 10 times per week, 2 times per hour, 100 times per year, etc. In certain embodiments, the frequency value is a movement pace of a user. For example, the frequency value may be higher when a user is hurrying.

Consistent with various embodiments, the user may use a mobile device to manage route preferences. For example, the mobile device may be a smart phone, tablet, smart watch, or other wearable computer device. In certain embodiments, the mobile device used to manage route preferences is the same mobile device used to capture the first set of images. Consistent with various embodiments, the first route may also be determined manually by a user. Accordingly, the user can input a route traversal initiation command to create a starting point of the first route. In certain embodiments, the route traversal initiation command is received by the mobile device. The route traversal initiation command, in certain embodiments may, in certain embodiments, be input via a voice command, button press, or touch screen navigation. In response to receiving the route traversal initiation command, the method 100 includes collecting image data and distance data for a path traversed by a user. The image data may include pictures of the environment surrounding the user. The distance data may be collected by accelerometers of the mobile device, and may track how far the user travels along the path. In response to receiving a route traversal termination command, the method 100 can include creating an ending point of the first route.

As an example, a user at a workplace may input a route traversal initiation command to a mobile device, creating a starting point for the first route. The user may then proceed from his or her office to a vending machine. While the user is moving from his or her office to the vending machine, the method 100 can include collecting data in the form of images, step counts, changes in direction, and other data to establish the path from the office to the vending machine. When the user arrives at the vending machine, he or she may input a route traversal termination command to the mobile device, indicating that the destination has been reached, and creating an ending point of the first route. In certain embodiments, the ending point of the first route may be created in response to the user pausing at the vending machine for a time period greater than a threshold length of time.

Consistent with various embodiments, at block 106 the method 100 includes capturing a second set of images during a second traversal of the first route. As described herein, the second set of images is be captured by a mobile device. For example, the second set of images may be captured by a smart phone, tablet, smart watch, wearable computing device, or other such system. The images can be stored locally on the mobile device, or may be stored on a remote storage device or server accessible to the mobile device. The images may portray the features of the environment surrounding the user. For example, the images may show a hallway including one or more doorways, wastebaskets, people, and other features of the environment. The second traversal may be movement of a user from the first location to the second location along the first route, and may take place subsequent to the first traversal. In certain embodiments, the second set of images may replace the first set of images, and serve as an updated "baseline" for the first route.

Consistent with various embodiments, the first set of images and the second set of images are captured at a set of image capture locations along the first route. The image capture locations may be one or more specific features or areas of the first route where capturing images may be associated with benefits for a user navigating the first route. As an example, the image capture locations may include doorways, corners, hallways entrances, or configurable distance increments (e.g., every three feet along a straight hallway). Other image capture locations are also possible. In certain embodiments, the image capture locations are automatically identified by the method 100 based on changes in direction, walking speed, or other movement characteristics detected by accelerometers of the mobile device. In certain embodiments, the image capture locations are identified by image data collected by the mobile device while determining the first route. In certain embodiments, the image capture locations are programmable by a user, and managed using the mobile device.

Consistent with various embodiments, at block 108 the method 100 includes identifying, by comparing the first set of images with the second set of images, an object in the second set of images meeting an obstruction criteria. In certain embodiments, identifying the object in the second set of images meeting the obstruction criteria includes using a digital image processing algorithm. The digital image processing algorithm can compare the first set of images with the second set of images, and use one or more object recognition techniques to identify the object in the second set of images. A variety of object recognition techniques are possible. For example, the digital image processing algorithm may use edge matching (e.g., Carny edge detection), greyscale matching, gradient matching, feature based methods, geometric hashing, Speeded Up Robust Features (SURF) techniques, and the like. In certain embodiments, the digital image processing algorithm uses Scale-Invariant Feature Transform (SIFT) to identify the image. Accordingly, the SIFT technique can use one or more "training images" to extract features descriptions of various objects, and match features of the object in the second set of images with the feature descriptions of the objects in the training images to identify the object.

Consider the following example. The SIFT technique may use training images of potted plants, janitorial carts, chairs, desks, and other objects to identify feature descriptions such as the dimensions, shape, light reflective properties (e.g., response to illumination changes), and other key points for each object of the training images. Accordingly, in embodiments of the present disclosure, the SIFT technique may identify an object by comparing the first set of images to the second set of images, and determining that an object in the second set of images was not present in the first set of images, and matches the feature description of a known object.

As described herein, in certain embodiments, the object of the second set of images meets an obstruction criteria. The digital image processing technique includes determining whether a given object in the set of images meets the obstruction criteria. The obstruction criteria may include one or more factors that indicate that the object may be a potential obstacle or hazard for a user (e.g., a visually impaired user) traversing the area in which the object is located. In certain embodiments, the obstruction criteria includes a displacement threshold and an object size threshold. The obstruction criteria may be fulfilled if an object meets either the displacement threshold or the object size threshold. The displacement threshold may be a distance that an object has moved between the first set of images and the second set of images. For example, in certain embodiments, the displacement threshold is 20 centimeters. Accordingly, an object in the second set of images that has moved less than 20 centimeters from its position in the first set of images may not meet the obstruction criteria, while an object in the second set of images that has moved more than 20 centimeters from its original position in the first set of images may meet the obstruction criteria.

In certain embodiments, the object size threshold is a set of dimensions. In certain embodiments, the object size threshold includes a length threshold, width threshold, and height threshold. An object that exceeds either the length threshold, width threshold, or height threshold may meet the obstruction criteria. As an example, in certain embodiments, the object size threshold is a length of 10 centimeters, a width of 10 centimeters, and a height of 30 centimeters. Accordingly, a potted plant that is 8 centimeters long, 8 centimeters wide, and 32 centimeters tall meets the obstruction criteria. Although an object size threshold and a displacement threshold are specifically mentioned herein, other obstruction criteria (e.g., a temperature threshold, object sharpness criteria, etc.) are also possible. In certain embodiments, the obstruction criteria are managed by a mobile device. For example, the mobile device can include a set of preferences that allow a user to define the displacement threshold and the object size threshold.

Consistent with various embodiments, at block 110 the method 100 includes providing, in response to identifying the object in the second set of images meeting the obstruction criteria, a notification of the object. Consistent with various embodiments, the notification of the object can be provided in one of a number of ways. For example, in certain embodiments, the notification of the object is provided in the form of a voice message delivered via the mobile device, (e.g., smart phone, smart watch, tablet, etc.) or wearable computing device of the user. In certain embodiments, the mobile device of the user vibrates or makes a noise to indicate that an object meeting the obstruction criteria has been identified in the route. In certain embodiments, the notification includes a physical description of the object, a distance indicating how far the object is from the user (e.g., 4 meters), the orientation of the position of the object, and the bearing of the objet (with respect to the user). Other methods of providing the notification of the object meeting the obstruction criteria are also possible.

Consistent with embodiments of the present disclosure, aspects of the method 100 may be implemented using an application on a mobile device (e.g., an app on a smart phone or tablet), a wearable computing device, or a surveillance system (e.g., surveillance sensors and cameras) stationed within a building or a home environment.

Figure 2:
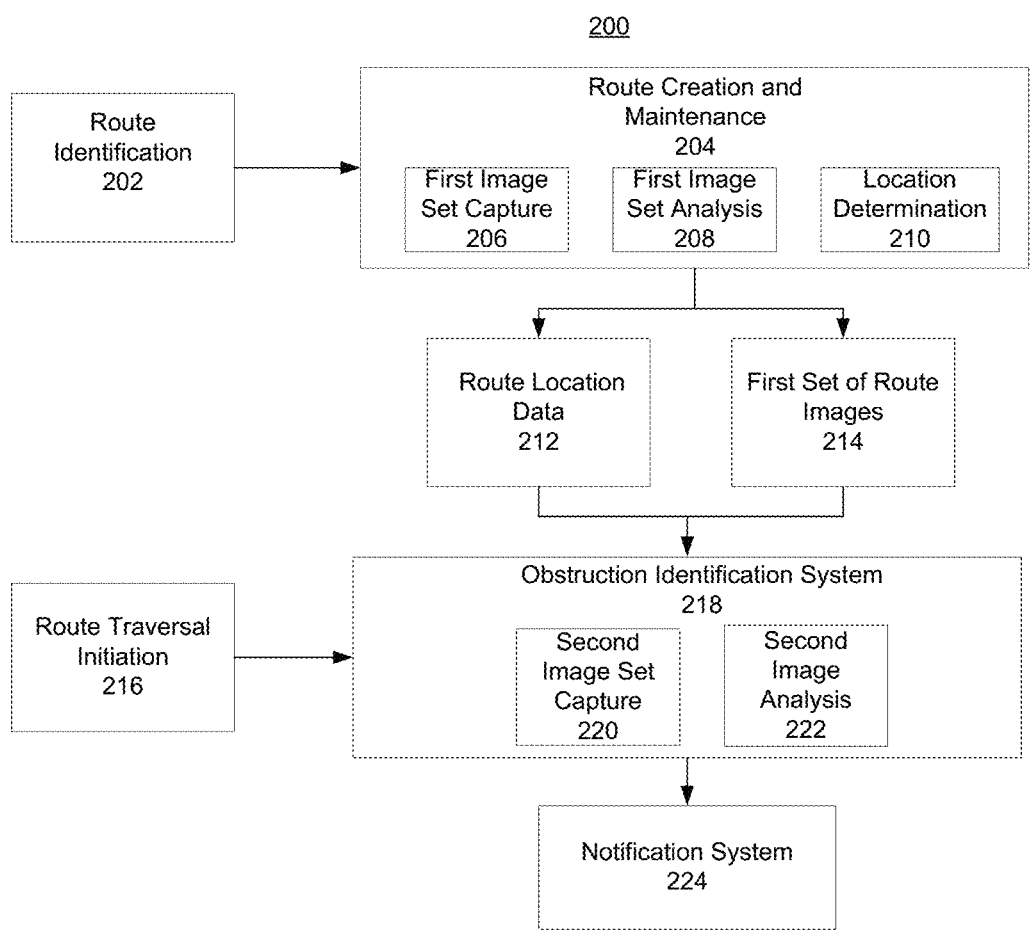
FIG. 2 is an example system for identifying an obstacle in a route, according to embodiments.

FIG. 2 is an example system 200 for identifying an obstacle in a route, consistent with embodiments of the present disclosure. As shown in FIG. 2, the system 200 can include a route identification block 202, a route creation and maintenance block 204, a first image set capture block 206, a first image set analysis block 208, a location determination block 210, a route location data block 212, a first set of route images block 214, a route traversal initiation block 216, an obstruction identification system block 218, a second image set capture block 220, a second image analysis block 222, and a notification system block 224. Consistent with various embodiments of the present disclosure, the system 200 is configured to operate on a mobile device (e.g., as an application on a smart phone, smart watch, tablet, or wearable computing device).

Consistent with various embodiments, at block 202 the system 200 can be configured to identify a route. As described herein, the route may be a path frequently traveled by a user from one location to another (e.g., the path may have a frequency value higher than a frequency threshold value). The route may be identified in one of a number of ways. In certain embodiments, the route is determined based on the number of times that a user takes a particular route. For instance, the system 200 may be configured to monitor the number of times a user takes a set of paths, and identify a specific route in response to it having a frequency value higher than a frequency threshold value. In certain embodiments, the route identification is performed manually, by defining a route starting point (e.g., via a user inputting a route traversal initiation command into a mobile device configured to manage route preferences), traversing the first route, and then defining a route ending point (e.g., via a user inputting a route traversal termination command into a mobile device configured to manage route preferences.)

Consistent with various embodiments, the system 200 can include a route creation and maintenance block 204. As described herein, the route creation and maintenance block 204 can be configured to capture a first set of images at block 206. The first set of images may be captured by a mobile device such as a smart phone, smart watch, tablet, or other wearable computer device. The first set of images can represent a "baseline" for the route. The number of images captured for the route baseline may be determined based on the image capture rate, available storage space, network connectivity, or other parameters associated with the mobile device.

At block 208, the system 200 can be configured to analyze the first set of images. The first set of images may be analyzed with one of a number of image processing techniques (e.g., edge matching, greyscale matching, gradient matching, feature based methods, geometric hashing, Speeded Up Robust Features (SURF) techniques, and the like) to identify the placement of doorways, objects, hallways, corners, and other environmental features. Based on the image analysis, at block 210 the system 200 can be configured to determine a set of image capture locations for the route. The image capture locations may be one or more locations that may potentially be difficult for a user to navigate without guidance. For example, the image capture locations can be doorways, corners, desks, hallway entrances, or configurable distance increments (e.g., every 3 feet.) In certain embodiments, the first set of images may be tagged to indicate the set of image capture locations.

Consistent with various embodiments, the system 200 may, in certain embodiments, be configured to provide route location data 212 (e.g., the set of image capture locations) as well as the first set of images 214 (e.g., the baseline of the route) to the obstruction identification system 218. In certain embodiments, at block 216 the system 200 includes initiating a route traversal. The route traversal may include a user moving from a starting point to an ending point of the route identified at block 202. In certain embodiments, at block 216 the system 200 is configured to detect that the path of the user corresponds to the route identified at block 202 using a tracking system (e.g., GPS, an RFID bit attached to the user or mobile device, thermal imaging to track the user's body heat signature, etc.). In certain embodiments, the system 200 detects that the path of the user corresponds to the route identified at block 202 by capturing a preliminary image and comparing it to the first set of images.

Consistent with various embodiments, the system 200 can include an obstruction identification system 218. On a second traversal (e.g., a subsequent traversal after the route has been identified, baseline set of images have been captured and image capture locations have been determined) of the route identified at block 202, the system 200 can be configured to capture a second set of images. As described herein, the second set of images may be taken at the set of image capture points determined in block 202. The second set of images may be captured using the same mobile device (e.g., smart phone, smart watch, tablet, wearable computing device, etc.) used to capture the first set (e.g., baseline) images. In certain embodiments, the mobile device detects that the user has reached an image capture point using a tracking system (e.g., GPS, an RFID bit, thermal imaging, etc.) or using the tags of the first set of images.

Consistent with various embodiments, at block 222 the system 200 can be configured to analyze the second set of images to determine whether or not an object meeting an obstruction criteria is present in the route. As described herein, in certain embodiments, at block 222 the system 200 includes using a digital image processing algorithm to compare the first set of images with the second set of images. The digital image processing algorithm may use one or more object recognition techniques to identify an object that was not present in the first set of images but is present in the second set of images, or an object that has moved between the first set of images and the second set of images. The digital image processing algorithm may also use one or more image processing techniques to determine the dimensions and shape of the object. As described herein, at block 222 the system 200 can also be configured to determine whether the object meets an obstruction criteria, such as a displacement threshold (e.g., an object that has moved more than a certain distance between the first and second set of images) or an object size threshold (e.g., and object is of a size or shape that could potentially be a hindrance for a user).

In certain embodiments, the system 200 is communicatively connected to a central security system of a building or area. The central security system may use one or more security cameras located throughout the building to collect video footage for safety purposes. In certain embodiments, the central security system provides information regarding objects or obstacles to the system 200 in advance. Accordingly, in certain embodiments, the system 200 suggests an alternative route to the user, or notifies them of the potential objects prior to traversing a particular route. In certain embodiments, mobile devices of other users in the building are also communicatively connected to the system 200, and provide information (images, near-field communication data, etc.) to the system 200 indicating potential obstacles in certain parts of the building.

Consistent with various embodiments, at block 224, the system 200 can be configured to notify a user that an object meeting an obstruction criteria has been identified in the route. The user may be notified in one of a number of different ways. In certain embodiments, the notification is a voice message spoken through the mobile device (e.g., an audible notification using a media file). In certain embodiments, the mobile device vibrates or makes a sound to indicate the detection of an object meeting the obstruction criteria. Other methods of notifying the user of the object meeting the obstruction criteria are also possible (e.g., a braille printout at the starting point of the route).

Consistent with various embodiments, the system 200 may be communicatively connected to a calendar application of the user. The calendar application may, for example, be a smart phone application installed on a smart phone of the user. Accordingly, information of the calendar application may be leveraged by the system 200 for identifying objects or obstacles in a route. As an example, in certain embodiments, the calendar application may indicate that, at a certain day and time, a large meeting will be taking place in a conference room nearby a route frequently taken by a user. Accordingly, the system 200 may be configured to inform the user of the meeting, and suggest an alternative route.

In certain embodiments, the system 200 may be configured to collect information that may be used to assist a user in navigating an area or building. For example, the system 200 may be configured to track behavior and movement data of the user, as well as create an object map of an area or building, with the size and type of obstacles labeled on the map. In certain embodiments, the user may indicate to the system 200 (e.g., via a voice command, button press, or other input) a desired destination, and the system 200 may provide a suggested route based on the obstacle map and the historical behavior and movement data of the user.

Figure 3:
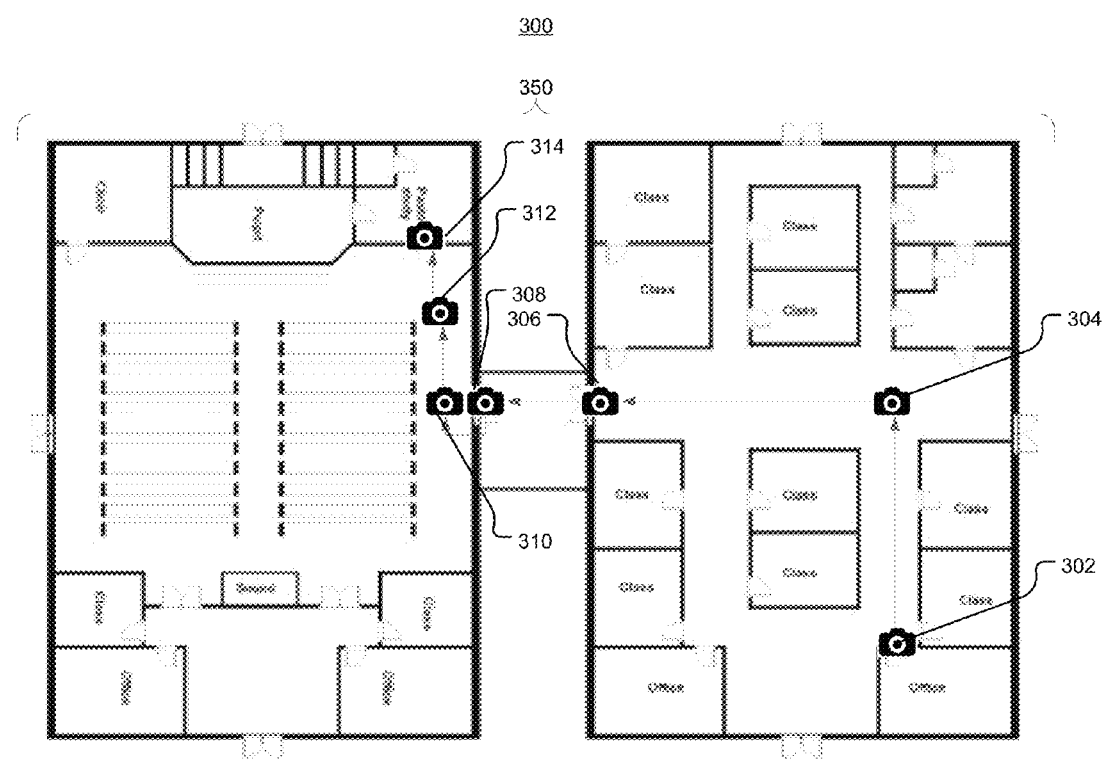
FIG. 3 is an example route traversal, according to embodiments.

FIG. 3 is an example route traversal 300, consistent with embodiments of the present disclosure. Aspects of FIG. 3, in certain embodiments, are directed toward a user navigating a route using a system and method for identifying an obstacle in a route. In certain embodiments, the user is visually impaired, and is navigating a school environment 350. In certain embodiments, the route traversal 300 includes one or more image capture points 302, 304, 306, 308, 310, 312, 314. In certain embodiments, the starting location of the user is an office, and the destination is a study room. The starting location may correspond with image capture point 302, and the destination may correspond with image capture point 314.

Consistent with various embodiments of the present disclosure, the user may define the first route. As described herein, the user may input a route traversal initiation command into a mobile device in the form of a voice command. Accordingly, if the route traversal initiation command is input to the mobile device when the user is at point 302, then point 302 may be determined to be the starting point of the first route. The user may then travel from point 302 to point 314, as shown in FIG. 3. As the user is traveling the route, the mobile device may capture a first set of images for the first route. The mobile device can analyze the first set of images using one or more image processing techniques, and determine a set of image capture locations. The image capture locations may be determined based on features of the school environment 350 that may be challenging for a visually impaired user to navigate. For instance, in the present example, image capture locations may be determined at corners or turns in the route, such as at point 304 and point 310. In certain embodiments, image capture locations are determined for doors and entrances, such as at point 306, 308, and 312. In certain embodiments, image capture locations are determined for the starting point and ending point of a route, such as at point 302 and point 314, respectively. When the user reaches point 314, he or she may input a route traversal termination command in the form of a voice command to the mobile device. Accordingly, point 314 may be established as the ending point of the first route.

In certain embodiments, at some point in time after the first route has been identified, the user may traverse the first route for a second time. Consistent with various embodiments of the present disclosure, the mobile device detects that the user is beginning to traverse the first route via a tracking system (e.g., GPS, an RFID bit attached to the user or mobile device, thermal imaging to track the user's body heat signature, etc.), accelerometers in the mobile device, or by comparing one or more images from the first set of images with images for the second traversal.

Consider the following example. The user may depart from his or her office with the intention of going to the study room. When the user leaves his or her office, the mobile device may capture an image capture point 302, the starting location of the first route. The image captured at image capture point 302 may be compared to an image for that location from the first set of images. In certain embodiments, no object or obstacle may be identified, and the user may continue to image capture point 304 without encountering an object or obstacle. An image may be captured by the mobile device at image capture point 304. The image captured at image capture point 304 may be compared to the "baseline" image of that location from the first set of images. In certain embodiments, a janitorial cart with an object size value above an object size threshold is identified in the path in front of the user. Accordingly, the mobile device may provide a notification to the user in the form of a voice message, announcing the location of the janitorial cart. The user may continue forward, aware of the potential obstacle.

The user may continue moving until image capture point 312 without identifying an object or potential obstacle at image capture points 308 or 310. In certain embodiments, when compared with the baseline image captured for that location, an image captured at image capture location 312 may indicate that a potted plant (e.g., a cactus with sharp needles) has been moved 50 centimeters from its original location in the baseline image. In certain embodiments, this displacement of 50 centimeters is greater than an object displacement threshold, and the potted plant is identified as meeting an obstruction threshold. Accordingly, the mobile device can provide a notification to the user in the form of a voice message, announcing the location of the potted plant. The user may then continue forward to reach his or her destination at image capture point 314.

Figure 4:
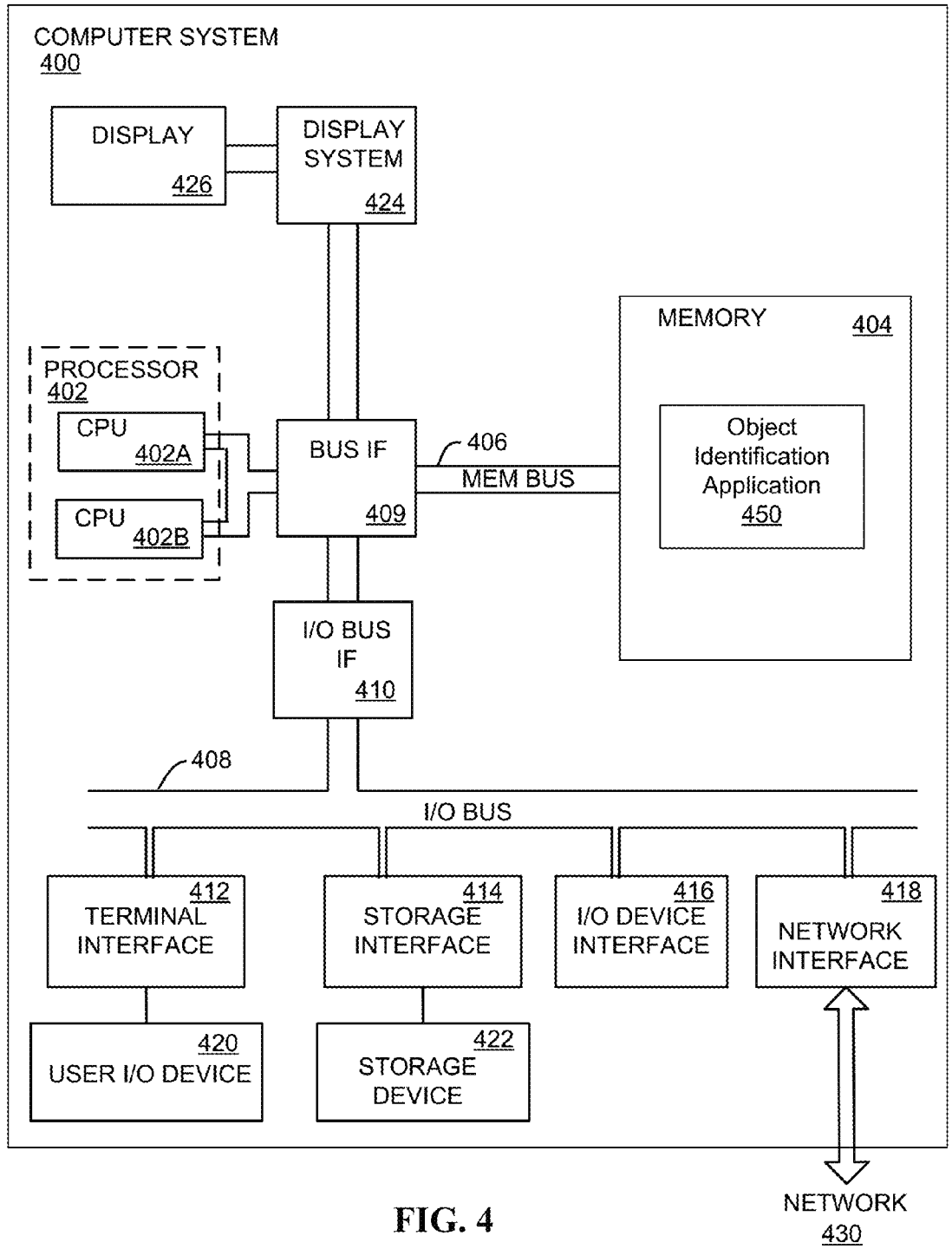
FIG. 4 depicts a high-level block diagram of a computer system for implementing various embodiments of the present disclosure, according to embodiments.

FIG. 4 depicts a high-level block diagram of a computer system 400 for implementing various embodiments. The mechanisms and apparatus of the various embodiments disclosed herein apply equally to any appropriate computing system. The major components of the computer system 400 include one or more processors 402, a memory 404, a terminal interface 412, a storage interface 414, an I/O (Input/Output) device interface 416, and a network interface 418, all of which are communicatively coupled, directly or indirectly, for inter-component communication via a memory bus 406, an I/O bus 408, bus interface unit 409, and an I/O bus interface unit 410.

The computer system 400 may contain one or more general-purpose programmable central processing units (CPUs) 402A and 402B, herein generically referred to as the processor 402. In embodiments, the computer system 400 may contain multiple processors; however, in certain embodiments, the computer system 400 may alternatively be a single CPU system. Each processor 402 executes instructions stored in the memory 404 and may include one or more levels of on-board cache.

In embodiments, the memory 404 may include a random-access semiconductor memory, storage device, or storage medium (either volatile or non-volatile) for storing or encoding data and programs. In certain embodiments, the memory 404 represents the entire virtual memory of the computer system 400, and may also include the virtual memory of other computer systems coupled to the computer system 400 or connected via a network. The memory 404 can be conceptually viewed as a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 404 may store all or a portion of the various programs, modules and data structures for processing data transfers as discussed herein. For instance, the memory 404 can store an object identification application 450. In embodiments, the object identification application 450 may include instructions or statements that execute on the processor 402 or instructions or statements that are interpreted by instructions or statements that execute on the processor 402 to carry out the functions as further described below. In certain embodiments, the object identification application 450 is implemented in hardware via semiconductor devices, chips, logical gates, circuits, circuit cards, and/or other physical hardware devices in lieu of, or in addition to, a processor-based system. In embodiments, the object identification application 450 may include data in addition to instructions or statements.

The computer system 400 may include a bus interface unit 409 to handle communications among the processor 402, the memory 404, a display system 424, and the I/O bus interface unit 410. The I/O bus interface unit 410 may be coupled with the I/O bus 408 for transferring data to and from the various I/O units. The I/O bus interface unit 410 communicates with multiple I/O interface units 412, 414, 416, and 418, which are also known as I/O processors (IOPs) or I/O adapters (IOAs), through the I/O bus 408. The display system 424 may include a display controller, a display memory, or both. The display controller may provide video, audio, or both types of data to a display device 426. The display memory may be a dedicated memory for buffering video data. The display system 424 may be coupled with a display device 426, such as a standalone display screen, computer monitor, television, or a tablet or handheld device display. In one embodiment, the display device 426 may include one or more speakers for rendering audio. Alternatively, one or more speakers for rendering audio may be coupled with an I/O interface unit. In alternate embodiments, one or more of the functions provided by the display system 424 may be on board an integrated circuit that also includes the processor 402. In addition, one or more of the functions provided by the bus interface unit 409 may be on board an integrated circuit that also includes the processor 402.

The I/O interface units support communication with a variety of storage and I/O devices. For example, the terminal interface unit 412 supports the attachment of one or more user I/O devices 420, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 420 and the computer system 400, and may receive output data via the user output devices. For example, a user interface may be presented via the user I/O device 420, such as displayed on a display device, played via a speaker, or printed via a printer.

The storage interface 414 supports the attachment of one or more disk drives or direct access storage devices 422 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 422 may be implemented via any type of secondary storage device. The contents of the memory 404, or any portion thereof, may be stored to and retrieved from the storage device 422 as needed. The I/O device interface 416 provides an interface to any of various other I/O devices or devices of other types, such as printers or fax machines. The network interface 418 provides one or more communication paths from the computer system 400 to other digital devices and computer systems; these communication paths may include, e.g., one or more networks 430.

Although the computer system 400 shown in FIG. 4 illustrates a particular bus structure providing a direct communication path among the processors 402, the memory 404, the bus interface 409, the display system 424, and the I/O bus interface unit 410, in alternative embodiments the computer system 400 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 710 and the I/O bus 408 are shown as single respective units, the computer system 400 may, in fact, contain multiple I/O bus interface units 410 and/or multiple I/O buses 408. While multiple I/O interface units are shown, which separate the I/O bus 408 from various communications paths running to the various I/O devices, in other embodiments, some or all of the I/O devices are connected directly to one or more system I/O buses.

In various embodiments, the computer system 400 is a multi-user mainframe computer system, a single-user system, or a server computer or similar device that has little or no direct user interface, but receives requests from other computer systems (clients). In other embodiments, the computer system 400 may be implemented as a desktop computer, portable computer, laptop or notebook computer, tablet computer, pocket computer, telephone, smart phone, or any other suitable type of electronic device.

FIG. 4 depicts several major components of the computer system 400. Individual components, however, may have greater complexity than represented in FIG. 4, components other than or in addition to those shown in FIG. 4 may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different manners, including using various computer applications, routines, components, programs, objects, modules, data structures, etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer system comprising one or more processors, one or more computer-readable memories, and one or more computer readable storage mediums having computer readable program code stored therein, said program code executable by at least one of the one or more processors via at least one of the one or more computer-readable memories to implement a method comprising:
- capturing a first set of images during a first traversal of a first route;
- capturing a second set of images during a second traversal of the first route;
- identifying, by comparing the first set of images with the second set of images, an object in the second set of images meeting an obstruction criteria; and
- providing a notification of the object which was identified as meeting the obstruction criteria;

wherein said capturing the first set of images during the first traversal of the first route includes:
- collecting route frequency data for a set of routes traversed by a user;
- determining, for a specific route of the set of routes traversed by the user, that a frequency value is greater than a frequency threshold value; and
- selecting, in response to determining that the specific route has the frequency value greater than the frequency threshold value, the route as the first route.

2. The computer system of claim 1, wherein the obstruction criteria includes a displacement threshold and an object size threshold.

3. The computer system of claim 1, said method further comprising:
- creating, in response to receiving a route traversal initiation command, a starting point of the first route;
- collecting, in response to receiving the route traversal initiation command, image data and distance data for a path traversed by a user; and
- creating, in response to receiving a route traversal termination command, an ending point of the first route.

4. The computer system of claim 1, wherein the first set of images and the second set of images are captured by a mobile device.

5. The computer system of claim 4, said method further comprising determining, using a user interface provided on the mobile device, a set of route preferences and a set of obstruction criteria preferences.

6. The computer system of claim 1, wherein the first route is a frequently traversed path by a user between a first location and a second location.

7. The computer system of claim 1, wherein said identifying the object in the second set of images meeting an obstruction criteria further comprises using a digital image processing algorithm configured to use Scale-Invariant Feature Transform (SIFT) techniques to detect one or more objects, and measure one or more dimensions of the one or more objects.

8. The computer system of claim 1, wherein the first set of images and the second set of images are captured at a set of image capture locations selected from a group consisting of doorways, corners, hallway entrances, or configurable distance increments.

9. A computer program product comprising a computer readable storage medium having program instructions stored therein, the program instructions executable by a first computing device to cause the first computing device to:
- collect route frequency data for a set of routes traversed by a user;
- determine, for a specific route of the set of routes traversed by the user, that a frequency value is greater than a frequency threshold value;
- select, in response to determining that the specific route has the frequency value greater than the frequency threshold value, the route as a first route;
- capture a first set of images during a first traversal of the first route;
- capture a second set of images during a second traversal of the first route;
- identify, by comparing the first set of images with the second set of images, an object in the second set of images meeting an obstruction criteria; and
- provide a notification of the object which was identified as meeting the obstruction criteria.

10. The computer program product of claim 9, wherein the program instructions are further executable by the first computing device to cause the first computing device to:
- create, in response to receiving a route traversal initiation command, a starting point of the first route;
- collect, in response to receiving the route traversal initiation command, image data and distance data for a path traversed by a user; and
- create, in response to receiving a route traversal termination command, an ending point of the first route.

11. The computer program product of claim 9, wherein the first set of images and the second set of images are captured by a mobile device.

12. The computer program product of claim 11, wherein the program instructions are further executable by the first computing device to cause the first computing device to determine, using a user interface provided on the mobile device, a set of route preferences and a set of obstruction criteria preferences.

13. The computer program product of claim 9, wherein the first set of images and the second set of images are captured at a set of image capture locations.

* * * * *